(12) United States Patent
Taylor et al.

(10) Patent No.: US 7,003,981 B2
(45) Date of Patent: Feb. 28, 2006

(54) LOW PHONON ENERGY GAIN MEDIUM AND RELATED ACTIVE DEVICES

(75) Inventors: Elizabeth Taylor, Southampton (GB); Gilberto Brambilla, Southampton (GB); Norberto Chiodini, Southampton (GB); Alberto Paleari, Southampton (GB); Giorgio Spinolo, Southampton (GB); Franca Morazzoni, Southampton (GB); Roberto Scotti, Southampton (GB)

(73) Assignee: University of Southhampton, Hampshire (GB)

( * ) Notice: Subject to any disclaimer, the term of this patent is extended or adjusted under 35 U.S.C. 154(b) by 91 days.

(21) Appl. No.: 10/260,414

(22) Filed: Oct. 1, 2002

(65) Prior Publication Data

US 2003/0087742 A1 May 8, 2003

Related U.S. Application Data

(60) Provisional application No. 60/327,768, filed on Oct. 10, 2001.

(30) Foreign Application Priority Data

Oct. 2, 2001 (EP) .......................................... 01308392

(51) Int. Cl.
*C03B 8/02* (2006.01)

(52) U.S. Cl. .................... 65/17.2; 65/17.3; 65/29.1; 65/29.19; 65/901; 252/584; 264/621; 385/141

(58) Field of Classification Search ................ 65/17.2, 65/17.3, 395, 396, 440, 901, 29.1, 29.12, 65/29.19, 29.21, 30.13, 32.3; 252/582, 584; 501/4, 11, 12, 32, 53, 64, 72; 264/621–623; 385/141–145
See application file for complete search history.

(56) References Cited

U.S. PATENT DOCUMENTS

| 5,679,466 | A | * | 10/1997 | Noguchi et al. ............. 428/551 |
| 5,824,240 | A | * | 10/1998 | Sato et al. .................. 252/582 |
| 6,189,304 | B1 | | 2/2001 | Burke et al. |
| 6,360,564 | B1 | * | 3/2002 | Cornelius et al. ............. 65/395 |
| 6,391,808 | B1 | * | 5/2002 | Stiegman ..................... 501/12 |
| 6,492,014 | B1 | * | 12/2002 | Rolison et al. .......... 428/317.9 |

FOREIGN PATENT DOCUMENTS

| EP | 0802169 A1 | 10/1997 |
| EP | 1139518 A1 | 10/2001 |
| WO | WO 98/29351 | 7/1998 |

OTHER PUBLICATIONS

W. H. Loh et al., "Single–Sided Output Sn/Er/Yb Distributed Feedback Fiber Laser", Appl. Phys. Lett. 69 (15), pp. 2151–2153, Oct. 7, 1996.

G. Brambilla et al., "Photorefractive Index Gratings In $SnO_2:SiO_2$ Optical Fibers", Applied Physics Letters, vol. 76, No. 7, pp. 807–809, Feb. 14, 2000.

(Continued)

*Primary Examiner*—Eric Hug
(74) *Attorney, Agent, or Firm*—Finnegan, Henderson, Farabow, Garrett & Dunner, L.L.P.

(57) ABSTRACT

Using sol-gel techniques, an optical gain medium has been fabricated comprising a glass ceramic host material that includes clusters of crystalline oxide material, especially tin oxide, and that is doped with active ions concentrated at the clusters. The active ions are preferentially located at the nanoclusters so that they experience the relatively low phonon energy of the oxide and are insensitive to the phonon energy of the host. A host with a high phonon energy, such as silica, can therefore be used without the usual drawback of reduced carrier lifetimes through enhanced nonradiative decay rates.

5 Claims, 5 Drawing Sheets

OTHER PUBLICATIONS

N. Chiodini et al., "Sol–Gel Synthesis Of Monolithic Tin–Doped Silica Glass", J. Mater. Chem., 9, pp. 2653–2658, (1999).

Norberto Chiodini et al., "Thermally Induced Segregation of $SnO_2$, Nanoclusters In Sn–Doped Silica Glasses From Oversaturated Sn–Doped Silica Xerogels", J. Mater. Chem., 11, pp. 926–929, (2001).

P.A. Tick et al., "Transparent Glass Ceramics for 1300 nm Amplifier Applications", J. Appl. Phys., 78 (11), pp. 6367–6374, Dec. 1, 1995.

Wm. J. Miniscalo, "Erbium–Doped Glasses for Fiber Amplifiers at 1500 nm", Journal of Lightwave Technology, vol. 9, No. 2, pp. 235–250, (Feb. 1991).

K. Petermann et al., "Rare–earth–doped sesquioxides", Journal of Luminescence 87–89, pp. 973–975., (2000).

V.V. Yakovlev et al., " Short–Range Order In Ultrathin Film Titanium Dioxide Studied By Raman Spectroscopy", Applied Physics Letters, vol. 76, No. 9, pp. 1107–1109, Feb. 28, 2000.

Enrique Fernández López et al., "Vibrational and electronic spectroscopic properties of zirconia powders", J. Mater. Chem., 11, pp. 1891–1897, (2001).

C. Carlone, "Raman Spectrum Of Zirconia–Hafnia Mixed Crystals" Physical Review B, vol. 45, No. 5, pp. 2079–2084, Feb. 1, 1992.

* cited by examiner

LOW PHONON ENERGY GAIN MEDIUM AND RELATED ACTIVE DEVICES

CROSS REFERENCE TO RELATED APPLICATIONS

This application claims the priority of European Patent Application No. 01308392.8, filed Oct. 2, 2001, and claims the benefit of U.S. Provisional Application No. 60/327,768, filed Oct. 10, 2001, the contents of both of which are incorporated herein by reference.

BACKGROUND OF THE INVENTION

The invention relates to a low phonon energy gain medium and to active devices comprising such a gain medium.

Optical gain media are well-known as forming the basis of both lasers and optical amplifiers. Many gain media are solid-state and comprise a host material doped with active dopant ions, such as rare earth ions. Silica is a particularly common host material for amplifiers, partly because the material is widely used in optical fibers. A silica amplifier is highly compatible with silica transmission fiber; they can be coupled together with low losses.

An integrated fiber laser may be fabricated from such a gain medium by additionally including a photosensitive dopant such as tin. The photosensitivity of tin allows optical gratings to be written directly into the fibers to provide the necessary cavity mirrors. Co-doping of silica fibers with the rare earth ions erbium or ytterbium for gain, and tin for photosensitivity, has been used to produce fiber lasers [1]. Tin-oxide-doped silica glass has been produced by modified chemical vapor deposition (MCVD) and the sol-gel technique [2–4], and tin-oxide-doped silica glass ceramics by the sol-gel technique alone [3, 4].

An important characteristic of a host material for a gain medium, is its principal optical phonon energy. A large phonon energy is associated with short carrier lifetimes arising from large non-radiative recombination rates. For a host material having a maximum phonon energy $E_p$ and an active dopant having a lasing energy transition $\Delta E$, the nonradiative recombination rate is a very strong function of the ratio $R=\Delta E/E_p$. The lower the value of R, the higher is the probability of undesirable nonradiative recombination. Therefore, host materials having low phonon energies $E_p$ are required, especially for small lasing energy transitions $\Delta E$.

Unfortunately, silica has a high principal optical phonon energy, which arises from contributions from vibrations of the Si—O bond, in the vicinity of 1000 cm$^{-1}$ [5]. Therefore, although silica is a useful host material as regards its compatibility with commonly used fibers, it is disadvantageous as far as phonon energy is concerned.

Fluoride glasses have been proposed as an alternative to silica [5, 6]. The phonon energy is 500 cm$^{-1}$, which makes these materials more suitable for hosting active dopants with a low $\Delta E$. However, fluoride glasses have low compatibility with silica optical fibers, and it is difficult to fabricate low loss fibers directly from fluoride glasses.

SUMMARY OF THE INVENTION

According to the invention there is provided an optical gain medium comprising a glass ceramic host material that includes clusters of crystalline oxide material and that is doped with active ions concentrated at the clusters. In one embodiment, the clusters contain tin oxide.

It has been discovered that in the presence of tin oxide clusters, doping with active ions results in the active ions being concentrated at the tin oxide clusters, rather than being evenly distributed throughout the host material, as might be expected. The active ions thus predominantly experience the low phonon energy environment of the tin oxide clusters, rather than the phonon environment of the host. The host material can thus be chosen without regard to its phonon energy, allowing high phonon energy host materials such as silica to be used without the usual drawbacks. It is thus possible to fabricate a gain medium based on a silica host material that has an improved carrier lifetime (i.e. reduced nonradiative recombination rate) in comparison to conventional active ion doped silica in which the active ion dopants are distributed evenly throughout the silica host.

The clusters may be of substantially pure tin oxide. However, embodiments of the invention use other oxides, so that the crystalline oxide material includes an oxide of at least one of zirconium, scandium, yttrium, lutetium, titanium and hafnium. Like tin, these materials have low phonon energies so that the active ions experience a phonon energy less than that of the host material.

In embodiments of the invention, the host material is silica or a silicate glass so as to be compatible with other silica or silicate glass components, thus providing compatibility in terms of refractive index and other optical, physical and chemical properties. Therefore, fiber components can be joined together with low splicing losses and low Fresnel losses. Similarly planar devices can be more readily integrated. Optical mode distribution can also be maintained constant from one component to the next. The gain medium of the invention is thus superior to the previously proposed low phonon energy host materials based on fluoride glasses which are silica incompatible, and to silica glasses doped directly with active ions.

In embodiments of the invention, the active ions are rare earth ions, such as Er, Pr, Nd or Tm. The invention may however be applicable to other active ions. In one example, the rare earth element Tm is used as the active ions in at amplifier for amplification in the range 1450–1520 nm, and especially at around 1470 nm, which has application in dense wavelength division multiplexed (DWDM) systems operating between the second and third telecommunications windows. By contrast, devices made from silica doped directly with Tm$^{3+}$ ions are known to have an undesirably high level of nonradiative decay at the 1470 nm lasing transition, owing to the high phonon energy of silica.

At least from the experiments performed to date, it appears that the tin oxide needs to be present above a certain concentration to induce cluster formation. In the examples, a tin oxide concentration of greater than about 0.5 mol % is needed for the desired glass ceramic formation with clusters. It is thought that the tin oxide may be present up to concentrations of 30 mol % or above.

The tin oxide clusters may be nanoclusters, typically with cluster diameters of between 5 and 10 nm. Cluster diameters of up to 50 nm may be acceptable, although smaller cluster sizes in the 1 to 10 nm range are preferred. The cluster diameter should be small enough to avoid significant scattering losses at the operating wavelength, for example at 1.3 µm or 1.5 µm, from the refractive index difference between tin oxide and the host material.

The glass ceramic host with tin oxide clusters has good miscibility with rare earth ions, so that high concentrations of rare earth ions can be accommodated. Rare earth doping at concentrations up to 2 mol % is possible, with doping preferably in the range 0.1–2 mol %. High doping concentrations of the active ions above 1 mol % allows for the manufacture of smaller optical devices, since a sufficiently high level of active ions to provide a certain amount of gain can be contained within a smaller volume of gain medium. However, the concentration of the active ions needs to be kept below the level at which the active ions precipitate out and crystallize within the host, because this can undesirably reduce the excited state lifetime of the active ions.

In the examples described below, the host material is silica glass. Silicate glasses such as germanosilicate, phosphosilicate or borosilicate glass may be used in other examples.

The gain medium may be utilized in lasers and optical amplifiers, in fibers, planar waveguides or other waveguide technology.

Gain media according to the present invention may be manufactured by sol-gel techniques, which offer good control over the tin oxide cluster sizes. However, other techniques may be suitable for fabricating the gain medium.

More specifically, a further aspect of the present invention is directed to a method of manufacturing an optical gain medium comprising: preparing a solution containing tin and an active ion; allowing the solution to form a gel; evaporating the gel to form a sample of xerogel; and sintering the sample of xerogel to form a glass ceramic material containing clusters containing tin oxide clusters by subjecting it to a heating cycle.

In an embodiment of this method, the heating cycle comprises: heating the sample from a first temperature to a second temperature in an oxygenated atmosphere; maintaining the sample at the second temperature; heating the sample from the second temperature to a third temperature in an oxygenated atmosphere or in a vacuum; heating the sample from the third temperature to a fourth temperature in an oxygenated atmosphere; maintaining the sample at the fourth temperature in an oxygenated atmosphere; and cooling the sample from the fourth temperature to the first temperature in an oxygenated atmosphere.

BRIEF DESCRIPTION OF THE DRAWINGS

For a better understanding of the invention and to show how tie same may be cared into effect, reference is now made by way of example to the accompanying drawings in which.

DETAILED DESCRIPTION

Manufacture of the Gain Media

Figure 1:
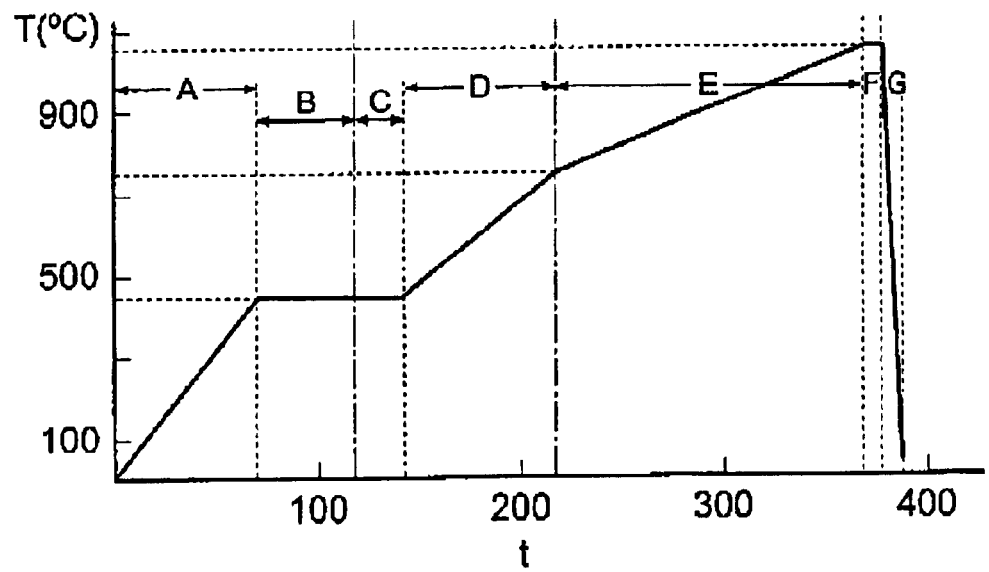
FIG. 1 shows a thermal cycle used in the manufacture of samples of gain media by a sol-gel technique.

Optical gain media described in the following embodiments and examples are of the glass ceramic type comprising a silica host material which contains clusters of tin oxide at which active ions are concentrated.

Samples of the gain medium have been made by a sol-gel technique. Sol-gel processing techniques are known for producing glasses and glass ceramics. The techniques involve first making a solution (sol) of precursor molecules in a solvent The molecules react together to form a wet gel, from which a dryer xerogel is created by evaporation. The xerogel is then heated, or sintered, according to a thermal cycle, to produce the end glass or glass ceramic material.

In the present case, the sol was formed by co-gelling a number of precursors in a solvent. Tetraethoxysilane (TEOS, $Si(OCH_2CH_3)_4$) provided silicon for silica, dibutyl tin-diacetate ($Sn(CH_2CH_2CH_2CH_3)_2(OOCCH_3)_2$) provided tin, and active ions, in this case of the rare earth metal erbium, came from erbium nitrate (($Er(NO_3)_3$).$5H_2O$). It will be understood that Er can be substituted with any other rare earth element as desired.

Active ions in the form of rare earth metals may also be provided by other inorganic salts (for example nitrates, acetates, halides) and also by soluble complexes or alkoxides such as $Er(OR)_3$, where R is a generic alkyl group. Similarly, other tin precursors are expected to give comparable results, such as those having the general formula $SnR_nX_{m-n}$ with m=4 and $0 \leq n \leq 3$, where R is a generic alkoxide group and X is a halide group, a carboxyl anion or alkoxide group. Silicon may be provided by pure or mixed compounds described by the general formula $SiR_nX_m(OR)_w$ where $0 \leq n,m,w \leq 4$ and n+m+w=4, and R is an alkyl group, X is a halide or carboxyl anion group and (OR) is an alkoxide group. In particular, the addition of alkyl silane (such as trimethylsilylacetate or trimethylmethoxysilane) may be used to obtain sols suitable for spin- or dip-coating deposition of thin films for planar device fabrication. Furthermore, the sol-gel reaction among these precursors may be modified by a suitable change of solvent to obtain xerogels with different mechanical properties and porosity. For example, a solvent such as ethanol may be partially or totally substituted by dimethylformamide, chetons, methoxyethanol and other solvents generally known as drying-control-chemical-additives (DCCA). In addition, other dopant elements (such as Ge, P and B) may be introduced by suitable precursors (such as Ge alkoxide, B alkoxide, and P ester).

Various proportions of the precursors were used to make a number of samples having different compositions, including samples lacking rare earth ions that were made for the purposes of comparison. Gelation via evaporation was achieved by leaving the samples in a sealed container in a thermostatic chamber at 35° C., resulting in xerogels. Evaporation times of between two hours and two weeks were used; two weeks were required to produce balk samples of material.

FIG. 1 shows the thermal cycle applied to the xerogel samples by heating them in a furnace. The temperature T is plotted as a function of time t in hours, the sintering process taking in excess of 400 hours. The thermal cycle had seven phases, A, B, C, D, E, F and G.

During Phase A, which lasted for approximately 70 hours, the samples were kept in an oxygen atmosphere and heated steadily from 0° C. to about 450° C. During Phase B, this temperature was maintained for about 48 hours, as was the oxygen atmosphere.

In Phase C the samples were kept in a vacuum (about 0.1 Pa) for about 24 hours, following which, during Phase D, in which the vacuum was maintained, the temperature was increased at a constant rate of 4° C./hour up to about 750° C. During Phase E a 1% He:$O_2$ atmosphere was provided, and the heating continued for 150 hours up to 1050° C. In Phase F this temperature was maintained for 10 hours or so. Finally, during Phase G the samples rapidly cooled back to room temperature in the course of about 10 hours.

Numerous variants of this heating cycle have been tested. Faster cycles may be used, but this can increase the probability of sample cracking. Insertion of further steps at constant temperature, and substitution of the vacuum by a pure oxygen atmosphere in the Phases D and E may be used to modify the sample structure. Further processing steps in drying agents were also tested, with the aim of improving the optical properties of the rare earth ions.

After the heating cycle, the samples appeared to be completely sintered.

Samples made by the above-described sol-gel technique may be subjected to a few minutes of thermal annealing at a higher temperature near to their softening temperature range. Such treatment may improve the emission properties of the rare earth ions in the glass ceramic gain medium allowing higher rare earth doping levels.

Structure of the Gain Media

Table 1 lists the characteristics of nine samples produced by this technique. Samples 1, 2 and 3 contained no erbium ions, so that comparative tests with erbium doped material could be carried out.

TABLE 1

| Sample No. | $SnO_2$ (mol %) | Er (mol %) | Physical state |
|---|---|---|---|
| 1 | 0.2 | 0 | Glassy |
| 2 | 0.4 | 0 | Glassy |
| 3 | 3.2 | 0 | Glass ceramic |
| 4 | 0.4 | 0.4 | Glassy |
| 5 | 3.2 | 0.34 | Glass ceramic |
| 6 | 3.2 | 0.67 | Glass ceramic |
| 7 | 3.2 | 1 | Glass ceramic |
| 8 | 3.2 | 1.34 | Glass ceramic |
| 9 | 3.2 | 1.67 | Glass ceramic |

As can be seen from the final column of the table, which gives the physical state of the samples, the samples can be classified into one of two groups, depending on their level of tin-dioxide ($SnO_2$). The dividing point between the two groups lies at approximately 0.5 mol % of $SnO_2$, with glasses being formed at $SnO_2$ concentrations below about 0.5 mol % and glass ceramics being formed at $SnO_2$ concentrations above about 0.5 mol %. The glass ceramics are materials having a glass network or matrix containing very small crystals or clusters of $SnO_2$. Although Table 1 lists samples having $SnO_2$ concentrations of 0.2, 0.4 and 3.2 mol %, samples containing other amounts including 0.5, 1 and 15 mol % of $SnO_2$ have been fabricated. It is believed that tin dioxide can be incorporated at levels up to at least 30 mol %.

It has previously been shown [3] that in tin-doped silica (tin silicate), the physical state depends on the concentration of $SnO_2$. Tin ions are bigger than silicon ions, but at low concentrations the tin is included in the silica matrix at substitutional positions. At these low concentrations, no crystallization of $SnO_2$ occurs, and the material is glassy. At higher concentrations, oxygen coordinated Sn sites cluster together and form $SnO_2$ clusters, which have an average diameter somewhat less than 10 nm. A cluster size in the nanometer range is preferable because it means that the crystal clusters do not induce significant scattering losses at the wavelengths commonly used in telecommunications applications. In other words, the cluster size is much less than the intended guiding wavelength, typically at least an order of magnitude less. Scattering arises from mismatch between the refractive index values of the clusters and matrix. Tin oxide has a refractive index of around 2, whereas the index of silica is nearer to 1.5, so that the difference between the two is relatively large. Manufacture by the sol-gel technique offers sufficient control for the cluster size to be kept to less than 10 nm. The cluster size can be controlled in the sol-gel heating cycle, by the use of fewer or more phases in which the sample is maintained at a constant temperature, and/or by the use of either a vacuum or an atmosphere of substantially pure oxygen during the final heating phases (for example, Phases D and E described above with reference to FIG. 1).

Measured Raman and UV-visible spectra obtained from the present samples containing erbium show similar behavior. At low concentrations of tin ions $Sn^{4+}$ (for example, Sample 4), tin is inserted in a substitutional position in the silica network, while at high concentrations (Samples 5 to 9), $SnO_2$ nanocrystals or nanoclusters occur.

Figure 2:
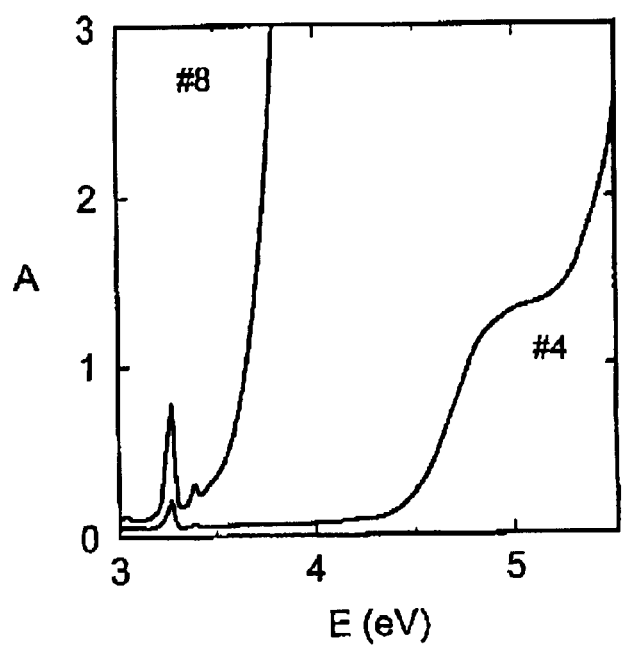
FIG. 2 shows measured ultraviolet absorption spectra from a sample of gain medium according to the present invention and from a comparison sample.

FIG. 2 shows ultraviolet absorption spectra (optical absorbance A against photon energy E) measured for Samples 4 and 8. The spectrum for Sample 8, which has a high $Sn^{4+}$ concentration, shows a strong absorption edge at 3.7 eV. This results from electronic transitions between valence and conduction bands in $SnO_2$, and its presence is therefore a sensitive indication of $SnO_2$ clustering [3]. The spectrum for Sample 4, which has a low $Sn^{4+}$ concentration, does not show this absorption edge, indicating that the tin is substituted in the silica network instead of being present in clusters. Therefore it is concluded that the presence of the erbium ions does not affect the overall till-silicate structure.

In the high tin concentration samples, the results show that, as a result of the fabrication process, the erbium ions are concentrated in or immediately around the $SnO_2$ clusters, most likely distributed within the clusters, or perhaps distributed on or adjacent to the cluster surfaces.

It is this unexpected effect that results in the advantageous properties of the material. Since the active ions are concentrated at the tin clusters, the effective phonon energy for the gain medium is that of the tin clusters, not the host material. Consequently, non-radiative decay rates are lower. If the active ions were not preferentially attracted to the metal clusters, there would be no significant difference between host material with tin clusters and host material without. At present, the precise mechanism by which the erbium ions are attracted to the $SnO_2$ clusters is not known. However, the fact that the surprising effect is occurring is borne out by the experimental results.

Figure 3:
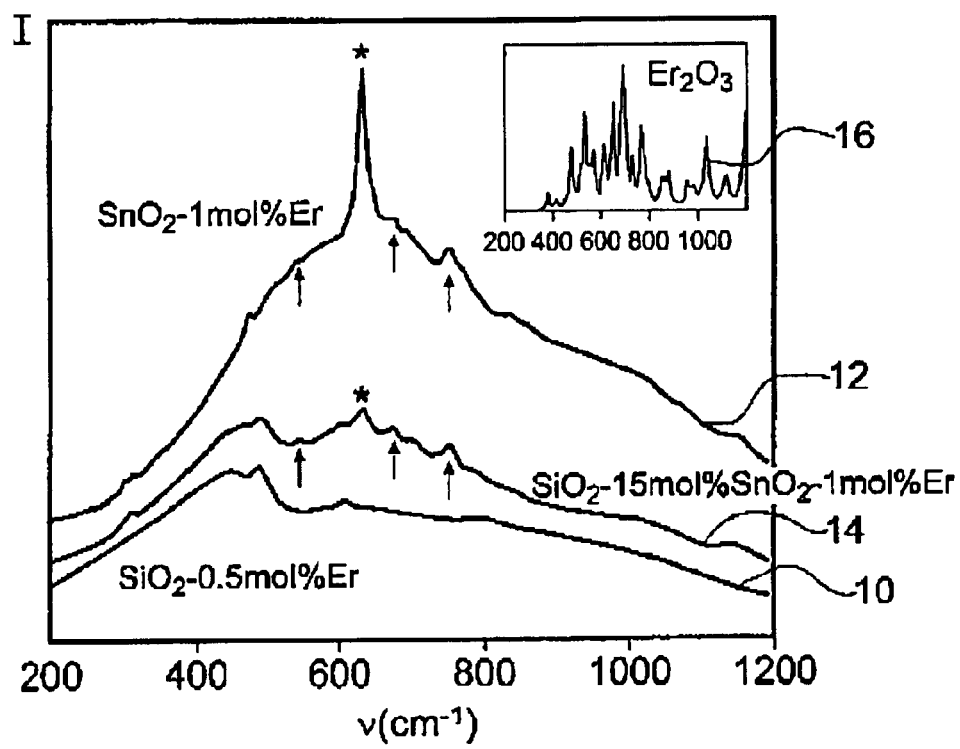
FIG. 3 shows measured Raman spectra from a sample of gain medium according to the present invention and from two comparison samples.

FIG. 3 shows Raman spectra (Raman intensity I against wavenumber v) which demonstrate that the erbium ions are held in the $SnO_2$ clusters. The spectra were measured by exciting various samples (including some not shown in Table 1) with 633 nm light from a helium-neon laser. Three spectra are shown, labeled 10, 12 and 14. Each of them shows a broad photoluminescence emission on which other features are superimposed. Spectrum 10 is from a sample of silica doped with 0.5 mol % of erbium, and containing no tin. The spectrum is relatively smooth, but includes peaks at 490 and 800 $cm^{-1}$, which are Raman scattering features of silica.

Spectrum 12 is from a sample of $SnO_2$ doped with 1 mol % of erbium, and containing no silica. The spectrum, which has an overall broad bell shape, shows an intense peak at 630 cm$^{-1}$, indicated by the asterisk in FIG. 3. This is the A$_{1g}$ Raman scattering mode of SnO$_2$, which clearly has a much lower energy than the principal silica mode at around 1000 cm$^{-1}$. Three much smaller peaks at 540, 670 and 750 cm$^{-1}$ are also seen, as indicated by the arrows in FIG. 3. These peaks are not believed to be due to Raman modes, as they are absent from anti-Stokes Raman spectra of the same material (not shown). These peaks have an intensity proportional to the erbium content, but are clearly not present in the spectrum of the tin-free sample (Spectrum 10). This suggests that these peaks arise from some interaction between the tin and the erbium.

Spectrum 14 is from a sample of silica containing 15 mol % SnO$_2$ and 1 mol % erbium. This SnO$_2$ concentration is high enough to be in the range where clusters are formed. The spectrum shows the silica Raman scattering peaks seen in Spectrum 10 in conjunction with the SnO$_2$ peak seen in Spectrum 12. Also, the three peaks at 540, 670 and 750 cm$^{-1}$ seen in Spectrum 12 are present, indicating that the same SnO$_2$-erbium structure is present as in the erbium-doped SnO$_2$ sample. This implies that the erbium ions are held in, or adjacent to, the SnO$_2$ clusters within the silica matrix, rather than being dispersed within the silica matrix itself.

This conclusion is supported by the spectrum inset in FIG. 3 and labeled 16, which is the Raman spectrum of clustered erbium oxide (Er$_2$O$_3$). The spectrum shows entirely different peaks to those of Spectrum 14. This indicates that the features of Spectrum 14 do not arise from erbium ions forming oxide clusters in the silica matrix, which suggests tat the ions are somehow trapped by the SnO$_2$ clusters.

Figure 4:
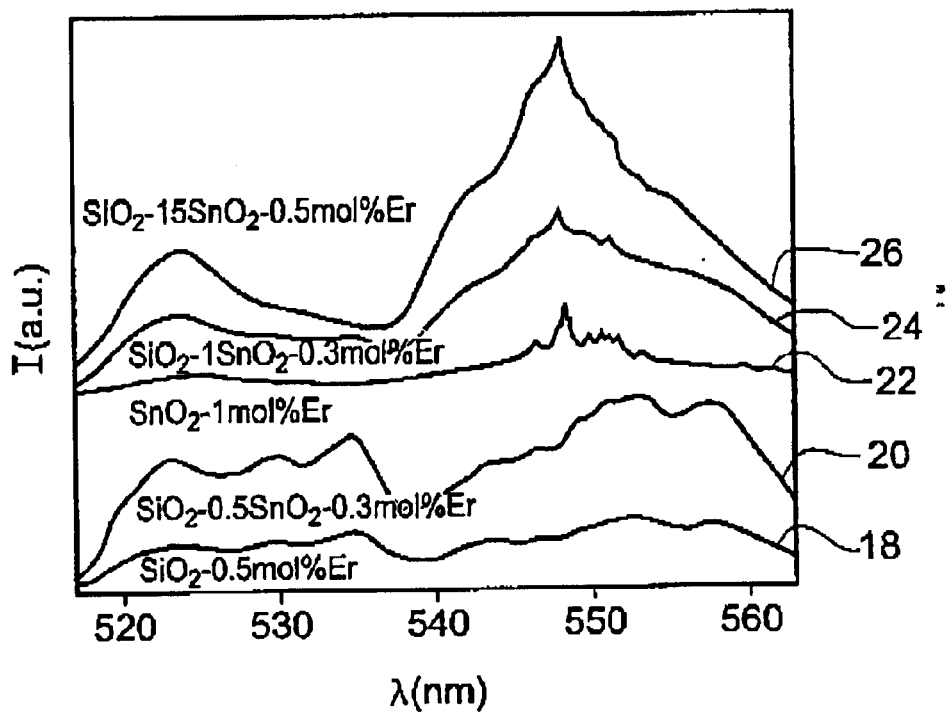
FIG. 4 shows measured photoluminescence spectra from two samples of gain media according to the present invention and three comparison samples.

FIG. 4 shows photoluminescence spectra (photoluminescence intensity I against wavelength λ) of a range of samples excited at 488 nm. These spectra provide further evidence that the erbium ions are preferentially located in or around the SnO$_2$ nanoclusters.

Five spectra are shown in FIG. 4, labeled 18, 20, 22, 24 and 26. Spectrum 18 is from a sample of erbium doped silica (0.5 mol % erbium) containing no tin and therefore having a glassy structure. Spectrum 20 is from a sample of erbium doped silica (0.3 mol % erbium) containing 0.5 mol % SnO$_2$, so that the sample has a glassy structure rather than being a glass ceramic. The two spectra are similar, showing the same features. Therefore, the tin ions do not greatly affect the structure of the erbium-doped silica, and can be assumed to be in substitutional positions in the silica matrix. In both cases, the erbium is dispersed within the silica matrix. The presence of tin does not affect this, as the tin concentration is too low for cluster formation.

Spectrum 22 is from a sample of SnO$_2$ doped with 1 mol % of erbium. A series of peaks is present around 550 nm. These peaks are not observed in the glassy samples.

Spectra 24 and 26 are both from glass-ceramic samples of erbium-doped silica containing concentrations of SnO$_2$ sufficient to form nanoclusters. Spectrum 24 has 1 mol % SnO$_2$ and 0.3 mol % erbium; Spectrum 26 has 15 mol % SnO$_2$ and 0.5 mol % erbium. Both spectra show the same peaks observed in Spectrum 22 from the erbium-doped SnO$_2$, indicating that the erbium ions are present within the SnO$_2$ nanoclusters rather than dispersed in the silica matrix.

The absence of erbium clustering is another advantageous feature of the material. It is known that in silica, rare earth ions, including erbium, tend to cluster when present in sufficient concentrations [7]. The clustering reduces the excited state lifetime of the ions, which is detrimental to the performance of a gain medium component. Significant interaction between Er$^{3+}$ ions has been observed in silica containing erbium concentrations as low as 100 parts per million [8]. The undesirable reduction in lifetime caused by the interactions is known as concentration quenching. An effect of this is that the useful level of rare earth doping in gain media is limited to below that at which clustering occurs. In turn, this limits the minimum size of components to that at which the desired quantity of rare earth ions can be accommodated at a concentration that does not cause clustering.

However, in the examples of the present invention, high concentrations of erbium are used, without clustering. Table 1 shows that erbium concentrations up to 1.67 mol % were used in the samples. Our results indicate that concentrations of rare earth elements up to at least 0.5 mol % can be incorporated without evidence of detrimental clustering. The reason for this is not fully understood. However, as a consequence, smaller devices can be made. This has great potential for the production of multifunctional integrated optical components in planar waveguide technology, and for reducing the lengths of fiber need in fiber-based devices. Rare earth concentrations above about 0.5 mol % begin to give concentration quenching, so that device efficiency is reduced. It is likely that concentrations of up to between 2 and 3 mol % can be tolerated before the lifetime is reduced to an unsatisfactory level.

Lasing Properties of the Gain Media

Measurements were made on samples of the material to evaluate the lasing properties.

The lasing efficiency of erbium-doped gain media depends on, among other things, the spontaneous emission probability A, and the quantum efficiency η of the $^4I_{13/2} \rightarrow ^4I_{15/2}$ transition of erbium ions Er$^{3+}$. These parameters depend on the interaction of the rare earth ions with the host material. Measured optical absorption and time resolved emission spectra can be used to calculate the parameters. In fact, $\eta = \tau_{PL}/\tau_{rad}$, where $\tau_{PL}$ is the experimental lifetime of photoluminescence recorded in the emission spectra, and $\tau_{rad}$ is the radiative lifetime of the $^4I_{13/2} \rightarrow ^4I_{15/2}$ transition, equal to 1/A.

The emission probability A can be calculated from the oscillator strength P of the absorption transition $^4I_{15/2} \rightarrow ^4I_{13/2}$, since $A=[2\pi n^2 e^2/(m_e c \epsilon_0 \lambda^2)]P$, where e is the charge on an electron, $m_e$, is the mass of an electron, c is the speed of light in a vacuum, $\epsilon_0$ is the vacuum dielectric constant, and n is the refractive index of the material at the wavelength λ. P may be estimated from measured experimental absorption spectra, by integrating the absorption band at the wavelength of interest, and using the relation $P=4.318 \times 10^{-9} \int \epsilon(v) dv$, where $\epsilon(v)$ is the molar extinction coefficient (1 mol$^{-1}$ cm$^{-1}$) at the wavenumber v (cm$^{-1}$).

Figure 5:
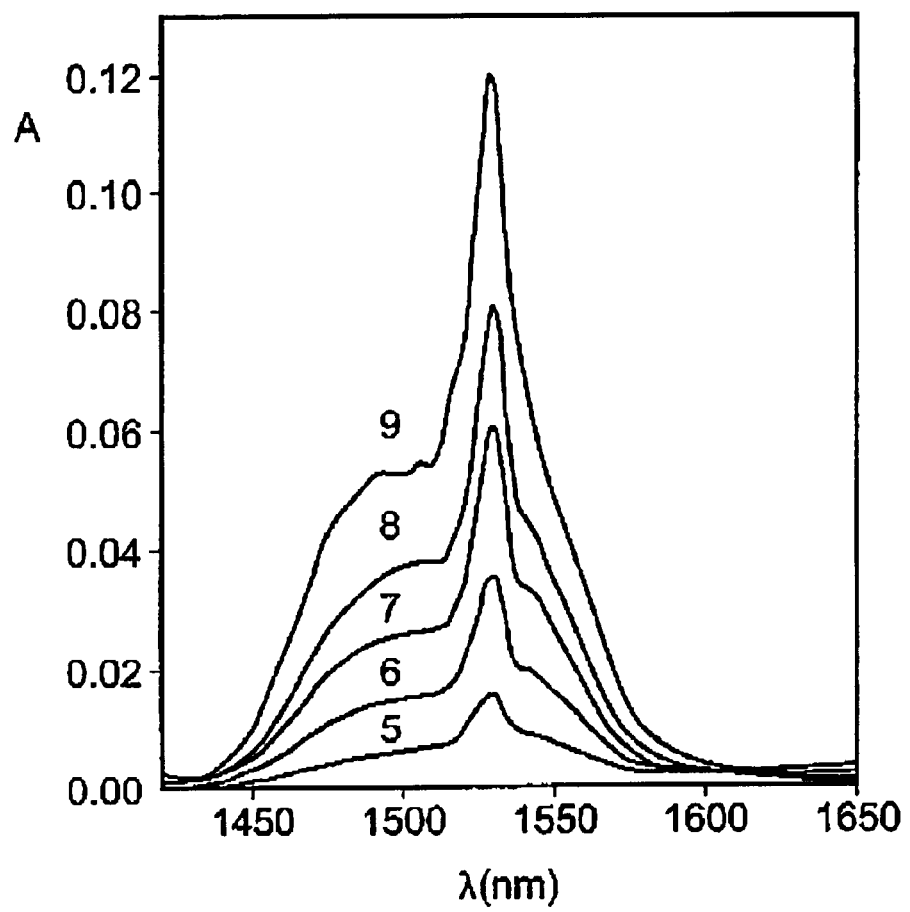
FIG. 5 shows the measured optical absorption owing to the $^4I_{15/2} \rightarrow {}^4I_{13/2}$ transition of erbium ions of five samples of gain media according to tee present invention.

FIG. 5 shows the measured optical absorption A of a number of samples owing to the $^4I_{15/2} \rightarrow ^4I_{13/2}$ transition of the erbium ions. Samples 5, 6, 7, 8 and 9 are shown. The samples had thicknesses of 1.3 mm. Values of P for each sample were estimated by integrating under these curves, and using the formula given in the previous paragraph. In addition, the photoluminescence lifetime $\tau_{PL}$ at 1.5 μm, was measured by exciting the samples with an argon ion laser delivering 15 mW at a wavelength of 514.5 nm.

Table 2 shows the values of $\tau_{PL}$, $\tau_{rad}$, P and η for three samples. Sample 4 was a glassy sample having no SnO$_2$ clusters, and Samples 5 and 8 were glass ceramics having SnO$_2$ clusters. The results show that $\tau_{PL}$ is smaller for the glass ceramic samples than for the glassy sample. However, $\tau_{rad}$ is also smaller for the glass ceramic samples, so that the quantum efficiency η of the glass ceramic samples is high, and is comparable with the quantum efficiency of the glassy sample.

TABLE 2

| Sample No. | $\tau_{PL}$ (ms) | $\tau_{rad}$ (ms) | P (×10$^6$) | η (%) |
|---|---|---|---|---|
| 4 | 12.0 | 22 | 0.74 | 55 |
| 5 | 7.4 | 17 | 0.93 | 44 |
| 8 | 5.7 | 11 | 1.42 | 52 |

Therefore, the lasing properties of the low phonon energy glass ceramic materials are comparable with those of the conventional glassy materials, so that the provision of a low phonon host material of this type is not detrimental to lasing efficiency.

The reliability of the estimated P values was tested by comparing them with calculated values. The calculations were made by fitting the intensity of observed $Er^{3+}$ absorption transitions from 1.5 μm to 300 nm for the samples within the so-called Judd-Ofelt formalism and Carnell matrices. Comparison of the calculated values with the estimated values indicated that the latter have an uncertainty of less than 20%.

Device Applications

Figure 6:
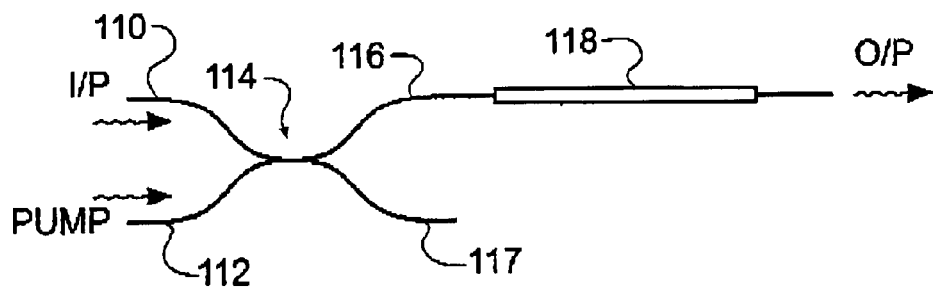
FIG. 6 shows an optical fiber amplifier according to an embodiment of the invention.

FIG. 6 shows a 1470 nm band rare-earth doped optical fiber amplifier. Pump radiation and a 1470 nm input signal are supplied to respective input arms 112 and 110 of a silica fiber coupler, and mixed in a fused region 114 of the silica coupler. A number of pumping schemes may be used. For example, the pump wavelength may be 800 nm, 1064 nm (from a Nd:YAG laser), 1047 nm (from a Nd:YLF laser) or in the range 1210±80 nm. The pump may also comprise two different wavelengths and/or be applied to an arm 117 of the coupler in a reverse pumping configuration. A portion of the mixed pump and signal light is supplied by an output arm 116 of the silica coupler to a section of $SnO_2$-clustered $Tm^{3+}$-doped silica fiber 118 where it is amplified and output. Other rare-earth dopants such as Er, Nd or Dy could also be used with an appropriate choice of pump wavelength.

Figure 7:
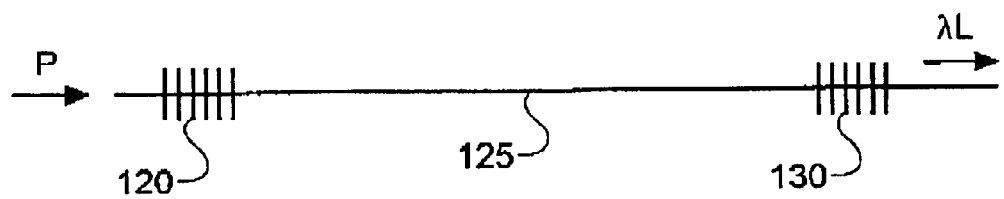
FIG. 7 shows an optical fiber laser according to an embodiment of the invention.

FIG. 7 is a schematic drawing of an optical fiber laser. A laser cavity is defined by first and second Bragg gratings 120 and 130 optically written into optical fibers having cores of photosensitive glass joined to a section of fiber gain medium 125 made out of the $SnO_2$ cluster-containing $SiO_2$ glass ceramic, as described above.

Figure 8:
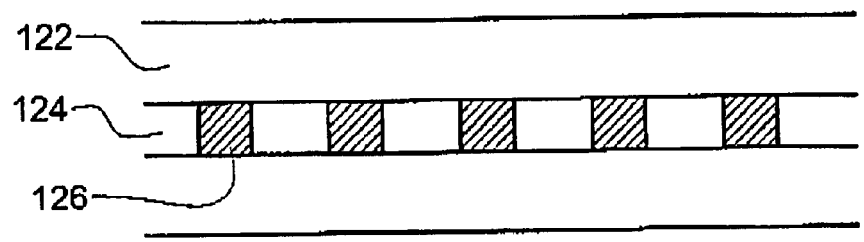
FIG. 8 shows a fiber Bragg grating reflector as used in the laser of FIG. 7.

FIG. 8 shows the Bragg grating 120/130 in more detail in axial cross-section. The fiber comprises a core 124 of photosensitive glass in which is optically written a grating structure comprising a periodically modulated refractive index profile, indicated schematically by the periodic shading 126 of the core 124 The core is surrounded by a clad 122.

The gain medium 125 may be doped with Tm, Er or another suitable rare earth element such as Nd or Yb. In operation, a pump beam P is used to excite stimulated emission in the cavity to produce a laser output of wavelength $\lambda_L$. The pump source may be integrated as a fiber laser, or may be a separate device, such as a semiconductor diode source.

Figure 9:
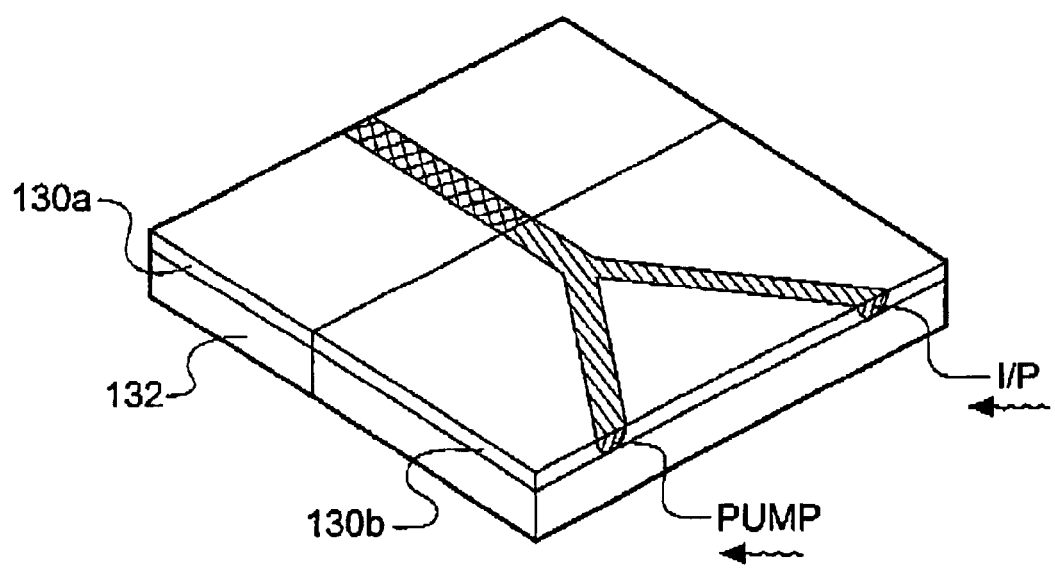
FIG. 9 shows an optical amplifier implemented in planar waveguides according to an embodiment of the invention.

FIG. 9 shows a planar waveguide amplifier structure written into co-planar layers 130a and 130b of glass. The waveguiding channel may be written into the layers 130a and 130b by a lithography method. The co-planar layers 130a and 130b are deposited on a silica substrate 132. Layer 130a comprises the gain medium described above, and includes a rare earth dopant, such as Er or Tm. In the layer 130b, there is no rare earth dopant, and only a silicate, such as germanosilicate or tin silicate, with conventional refractive index. The waveguide structure has the form of a Y-branch to provide a signal input I/P and pump input PUMP in the layer 130b, these inputs combining into a common channel that leads to the active medium layer 130a where amplification occurs.

SUMMARY

In summary, it has been discovered that erbium is preferentially attracted to tin oxide clusters in silica glass, so that a silica-based gain medium can be produced in which the active ions experience the phonon environment of tin oxide rather than silica, thus reducing nonradiative recombination rates, as is generally desirable. The effect appears to follow from the coexistence of tin oxide clusters and a rare earth element. Any rare earth element is believed to be suitable, namely La, Ce, Pr, Nd, Pm, Sm, Eu, Gd, Tb, Dy, Ho, Er, Tm, Yb, or Lu. Selection of the rare earth element will made on the basis of matching the desired optical application to the optical properties of relevant transitions of the rare earth elements, as is usual.

Since the effect appears primarily to follow from the coexistence of tin oxide clusters and a rare earth element, it is also to be expected that a wide variety of glass matrices may be possible, for example silicate glasses such as germanosilicate, phosphosilicate or other glass hosts. Furthermore, other crystalline materials are expected to yield similar effects as a low phonon energy host for rare earth ions, provided that the maximum phonon energy is sufficiently low and that it is possible to control the clustering process on a nanometer scale inside the glass host.

Other possible crystalline materials are the sesquioxides $Sc_2O_3$, $Y_2O_3$, and $Lu_2O_3$. They are suitable hosts for rare earth ions since the effective phonon energies are around 400 to 600 cm$^{-1}$ [9]. Moreover, $TiO_2$, $ZrO_2$ and $HfO_2$ possess sufficiently low phonon energy values below 800 cm$^{-1}$ [10, 11, 12]. All these oxides show low solubility in silica and are expected to be suitable for the production of glass ceramics. Nanostructured glass ceramics can be obtained from these oxides by sol-gel techniques, similarly to tin oxide silica glass ceramics, provided a substitutional xerogel is produced and a thermally activated clustering of the crystalline phase takes place. For instance, sol-gel reactions with TEOS may be carried out for $TiO_2$ and $ZrO_2$ by means of suitable heterosilsesquioxanes such as titaniumsilsesquioxane and zirconiumsilsesquioxane. Other Ti or Zr compounds useful for producing substitutionally doped xerogels are tetrakis (trimethylsiloxy)titanium $C_{12}H_{36}O_4Si_4Ti$ and tetrakis (trimethylsiloxy)zirconium $C_{12}H_{36}O_4Si_4Zr$. Other more commonly used reagents might be employed in the sol-gel synthesis, as metal-alkoxides, provided that suitable conditions are chosen to avoid uncontrolled phase separation during the sol-gel transition. This is important as glass ceramics commonly obtained from metal-alkoxide precursors typically do not show good optical properties owing to uncontrolled segregation.

References

[1] Loh W H, Dong L, Caplen J E, "Single-sided output Sn/Er/Yb distributed feedback fiber laser", *Applied Physics Letters*, 69 pp. 2151–2153, 1996

[2] Brambilla G, Pruneri V, Reekie L, "Photorefractive index gratings in $SnO_2$:$SiO_2$ optical fibers", *Applied Physics Letters*, 76 pp. 807–809, 2000

[3] Chiodini N, Morazzoni F, Paleari A, Scotti R, Spinolo G, "Sol-gel synthesis of monolithic tin-doped silica glass", *Journal of Materials Chemistry*, 9 pp. 4653–2658, 1999

[4] Chiodini N, Meinardi F, Morazzoni F, Padovani J, Paleari A, Scotti R, Spinolo G, "Thermally induced segregation of SnO2 nanoclusters in Sn-doped silica glasses from oversaturated Sn-doped silica xerogels", *Journal of Materials Chemistry,* 11 pp. 926–929, 2001

[5] Tick P A, Borrelli N F, Cornelius L K, Newhouse M A, "Transparent glass ceramics for 1300 nm amplifier applications", *Journal of Applied Physics,* 78 pp. 6367–6374, 1995

[6] WO 98/29351

[7] EP 0,802,169 A1

[8] Miniscalco W J, "Erbium-doped glasses for fiber amplifiers at 1500 nm", *Journal of Lightwave Technology,* 9 pp. 234–250, 1991

[9] Petermann K, Huber G, Fornasiero L, Kuch S, Mix E, Peters V, Basun S A, "Rare-earth-doped sesquioxides", *Journal of Luminosity,* 87–89 pp. 973–975, 2000

[10] Yakovlev V V, Scarel G, Aita C R, Mochizuki S, "Short range order in ultrathin film titanium dioxide studied by Raman spectroscopy", *Applied Physics Letters,* 76 pp. 1107–1109, 2000

[11] Lopez E F, Escribano V S, Panizza M, Carnasciali M M, Busca G, "Vibrational and electronic spectroscopic properties of zirconia powders", *Journal of Material Chemistry,* 11 pp 1891–1897, 2001

[12] Carlone C, "Raman spectrum of zirconia-hafnia mixed crystals", *Physical Review* B, 45 pp 2079–2084, 1992

What is claimed is:

1. A method of manufacturing an optical gain medium comprising:

preparing a solution containing tin ions and active ions;

allowing the solution to form a gel;

evaporating the gel to form a sample of xerogel; and sintering the sample of xerogel to form a glass ceramic material containing clusters containing tin oxide, wherein the active ions are within and/or adjacent to the clusters, by subjecting it to a heating cycle.

2. A method according to claim 1, in which the heating cycle comprises:

heating the sample from a first temperature to a second temperature in an oxygenated atmosphere;

maintaining the sample at the second temperature;

heating the sample from the second temperature to a third temperature in an oxygenated atmosphere or in a vacuum;

heating the sample from the third temperature to a fourth temperature in an oxygenated atmosphere;

maintaining the sample at the fourth temperature in an oxygenated atmosphere; and cooling the sample from the fourth temperature to the first temperature in an oxygenated atmosphere.

3. A method according to claim 1, wherein the solution comprises tetraethoxysilane, dibutyl tin-diacetate and a nitrate or isopropoxide or acetate of the active ion.

4. A method according to claim 1, wherein the active ion is a rare earth ion.

5. A method according to claim 1, wherein the glass ceramic material is silica or a silicate glass.

* * * * *